US010481329B2

(12) United States Patent
Scadden et al.

(10) Patent No.: US 10,481,329 B2
(45) Date of Patent: *Nov. 19, 2019

(54) FIELD TERMINABLE FIBER OPTIC CONNECTOR ASSEMBLY

(71) Applicant: CommScope Technologies LLC, Hickory, NC (US)

(72) Inventors: Jarrod Scadden, Bloomington, MN (US); Wagner da Silva Aguiar, Princeton, NJ (US); Wayne M. Kachmar, North Bennington, VT (US); Jeff Bearwald, Bloomington, MN (US); Alan Shores, Eden Prairie, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/226,134

(22) Filed: Dec. 19, 2018

(65) Prior Publication Data

US 2019/0196103 A1   Jun. 27, 2019

Related U.S. Application Data

(63) Continuation of application No. 15/643,251, filed on Jul. 6, 2017, now Pat. No. 10,162,113, which is a
(Continued)

(51) Int. Cl.
*G02B 6/255* (2006.01)
*G02B 6/25* (2006.01)
(Continued)

(52) U.S. Cl.
CPC ............ *G02B 6/255* (2013.01); *G02B 6/241* (2013.01); *G02B 6/25* (2013.01); *G02B 6/2553* (2013.01);
(Continued)

(58) Field of Classification Search
CPC ........ G02B 6/241; G02B 6/25; G02B 6/2553; G02B 6/2555; G02B 6/2558; G02B 6/3846; G02B 6/4292
See application file for complete search history.

(56) References Cited

U.S. PATENT DOCUMENTS 4,783,137 A   11/1988 Kosman et al.
5,238,428 A    8/1993 Brakenridge et al.
(Continued)

FOREIGN PATENT DOCUMENTS

CN   1051982 A   6/1991
EP   0171614 A2   2/1986
(Continued)

OTHER PUBLICATIONS

International Search Report and Written Opinion for Application No. US2009/050200, dated Nov. 11, 2009.

*Primary Examiner* — Thomas A Hollweg
*Assistant Examiner* — Mary A El-Shammaa
(74) *Attorney, Agent, or Firm* — Merchant & Gould P.C.

(57) ABSTRACT

A fiber optic connector assembly includes a connector and a carrier. The connector has first and second ends and a terminated fiber. The fiber defines a first end adjacent the first end of the connector and a second end protruding out of the second end of the connector. A carrier having a connector end and an opposite cable end is engaged with the connector. An alignment structure on the carrier includes a first end, a second end, and a throughhole and also a cutaway extending perpendicularly to and communicating with the throughhole. The fiber is positioned within at least a portion of the throughhole with the second end located within the cutaway. A window is within the cutaway over the second end of the fiber for visually inspecting the alignment of the second end of the fiber with an end of another fiber.

12 Claims, 10 Drawing Sheets

Related U.S. Application Data continuation of application No. 14/860,109, filed on Sep. 21, 2015, now Pat. No. 9,703,040, which is a continuation of application No. 13/872,695, filed on Apr. 29, 2013, now Pat. No. 9,146,352, which is a continuation of application No. 12/500,188, filed on Jul. 9, 2009, now Pat. No. 8,430,572.

(60) Provisional application No. 61/079,732, filed on Jul. 10, 2008.

(51) Int. Cl.
    *G02B 6/38*     (2006.01)
    *G02B 6/24*     (2006.01)
    *G02B 6/42*     (2006.01)

(52) U.S. Cl.
    CPC ......... *G02B 6/2555* (2013.01); *G02B 6/2558* (2013.01); *G02B 6/3846* (2013.01); *G02B 6/4292* (2013.01); *G02B 6/2551* (2013.01); *G02B 6/3806* (2013.01); *G02B 6/3861* (2013.01); *G02B 6/3879* (2013.01); *G02B 6/4204* (2013.01)

(56) References Cited

U.S. PATENT DOCUMENTS

| | | |
|---|---|---|
| 5,341,448 A | 8/1994 | Huebscher |
| 5,519,799 A | 5/1996 | Murakami et al. |
| 5,883,995 A | 3/1999 | Lu |
| 6,142,676 A | 11/2000 | Lu |
| 6,302,596 B1 | 10/2001 | Cohen et al. |
| 7,530,746 B2 | 5/2009 | Kachmar |
| 7,534,050 B2 | 5/2009 | Kachmar |
| 7,676,134 B2 | 3/2010 | Kachmar |
| 7,929,819 B2 | 4/2011 | Kachmar |
| 8,083,416 B2 | 12/2011 | Scadden et al. |
| 8,430,572 B2 | 4/2013 | Scadden et al. |
| 8,678,666 B2 | 3/2014 | Lu et al. |
| 2002/0048435 A1 | 4/2002 | Senzillo |
| 2007/0031092 A1 | 2/2007 | Saitoh et al. |
| 2007/0031093 A1 | 2/2007 | Takagi |
| 2007/0110374 A1 | 5/2007 | Oki et al. |
| 2008/0285922 A1 | 11/2008 | Kachmar |
| 2009/0269011 A1 | 10/2009 | Scadden et al. |
| 2013/0343708 A1 | 12/2013 | Scadden et al. |

FOREIGN PATENT DOCUMENTS

| | | |
|---|---|---|
| EP | 1612589 A1 | 1/2006 |
| JP | 5875104 | 5/1983 |
| WO | 0196923 A1 | 12/2001 |
| WO | 2008051030 A1 | 5/2008 |

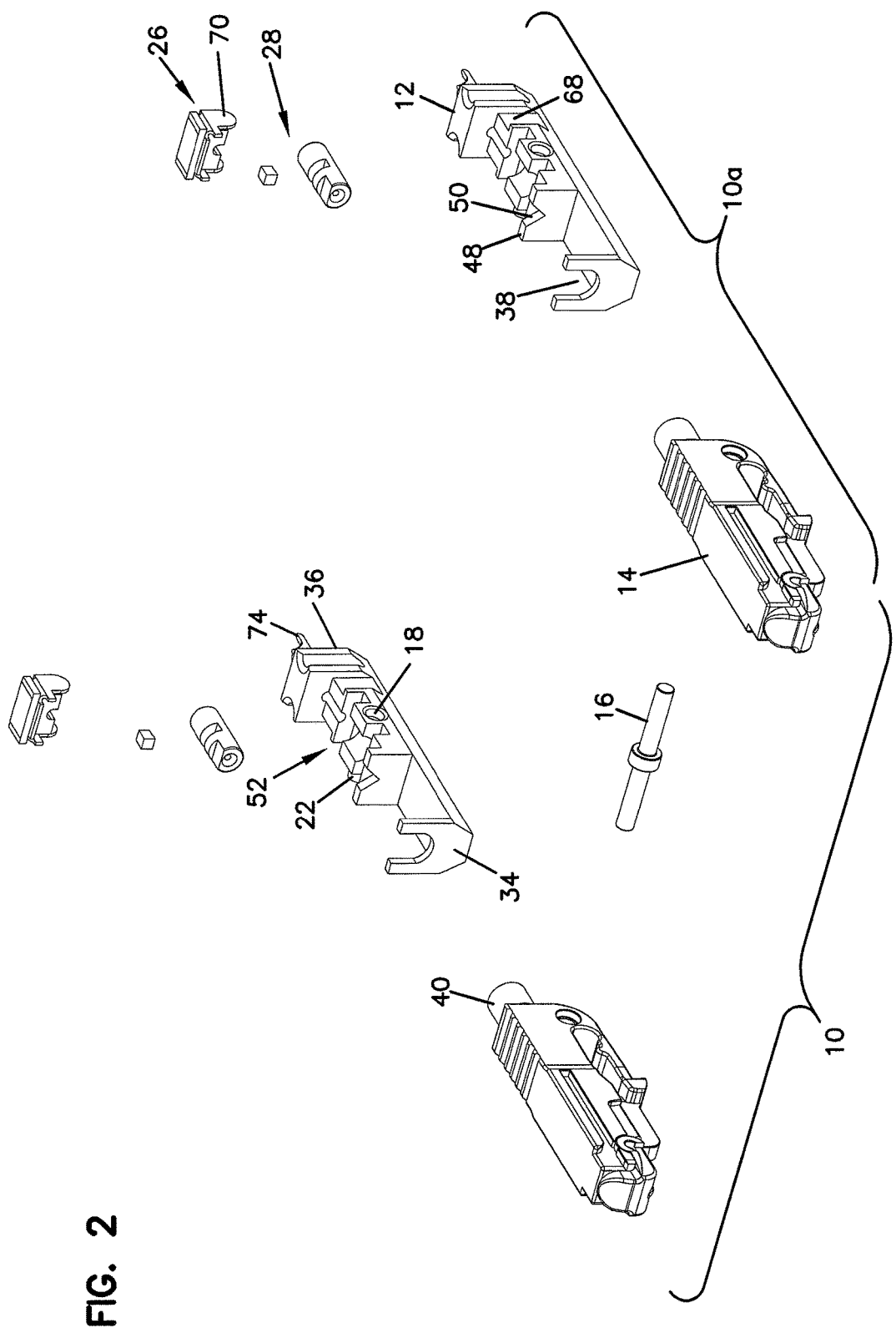

US 10,481,329 B2

FIELD TERMINABLE FIBER OPTIC CONNECTOR ASSEMBLY

CROSS REFERENCE TO RELATED APPLICATIONS

This application is a continuation of application Ser. No. 15/643,251, filed Jul. 6, 2017, now U.S. patent Ser. No. 10/162,113; which is a continuation of application Ser. No. 14/860,109, now U.S. Pat. No. 9,703,040; which is a continuation of application Ser. No. 13/872,695, filed Apr. 29, 2013, now U.S. Pat. No. 9,146,352; which is a continuation of application Ser. No. 12/500,188, filed Jul. 9, 2009, now U.S. Pat. No. 8,430,572; which application claims the benefit of provisional application Ser. No. 61/079,732, filed Jul. 10, 2008, which applications are incorporated herein by reference in their entirety.

TECHNICAL FIELD

The present disclosure relates to a fiber optic connector assembly, and more particularly, to a field terminable fiber optic connector assembly.

BACKGROUND

The use of fiber optic networks as a signal-carrying medium for communications is now widespread and continues to increase. Fiber optic networks frequently include a plurality of fiber optic cables having optical fibers. As fiber optic networks continue to grow, the need for optical fiber terminations for maintenance or expansion purposes is also growing. As such, there is a need for an optical fiber termination which can be performed in the field.

SUMMARY

An aspect of the present disclosure relates to a fiber optic connector assembly comprising a fiber optic connector having a first mating end and a second end and an optical fiber terminated to the fiber optic connector, the optical fiber defining a first end adjacent the mating end for optical connection to a second fiber optic connector, the optical fiber defining a second end protruding out of the second end of the fiber optic connector. A carrier having a connector end and an oppositely disposed cable end is engaged with the fiber optic connector. An alignment structure is disposed on the carrier, the alignment structure including a first end and a second end and a throughhole extending from the first end to the second end, the alignment structure including a cutaway portion extending generally perpendicularly to and communicating with the throughhole, the optical fiber terminated to the fiber optic connector being positioned within at least a portion of the throughhole with the second end of the optical fiber located within the cutaway portion of the alignment structure. A window is disposed within the cutaway portion of the alignment structure over the second end of the optic fiber, the window configured for visually inspecting an alignment of the second end of the optical fiber with an end of a second optical fiber entering the cable end of the carrier. A heat activated element that is configured to melt when exposed to a predetermined amount of heat and resolidify when the heat is removed bonds the first optical fiber to the second optical fiber.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings are included to provide a further understanding of the inventive aspects of the present disclosure and are incorporated in and constitute a part of this specification. The drawings illustrate exemplary embodiments of the present disclosure and together with the description serve to further explain the principles of the disclosure. Other aspects of the present disclosure and many of the advantages of the present disclosure will be readily appreciated as the present disclosure becomes better understood by reference to the following Detailed Description when considered in connection with the accompanying drawings, and wherein:

FIG. 2 is a fully exploded view of the fiber optic connector assembly of FIG. 1;

DETAILED DESCRIPTION

Reference will now be made in detail to the exemplary aspects of the present disclosure that are illustrated in the accompanying drawings. Wherever possible, the same reference numbers will be used throughout the drawings to refer to the same or like parts.

Figure 1:
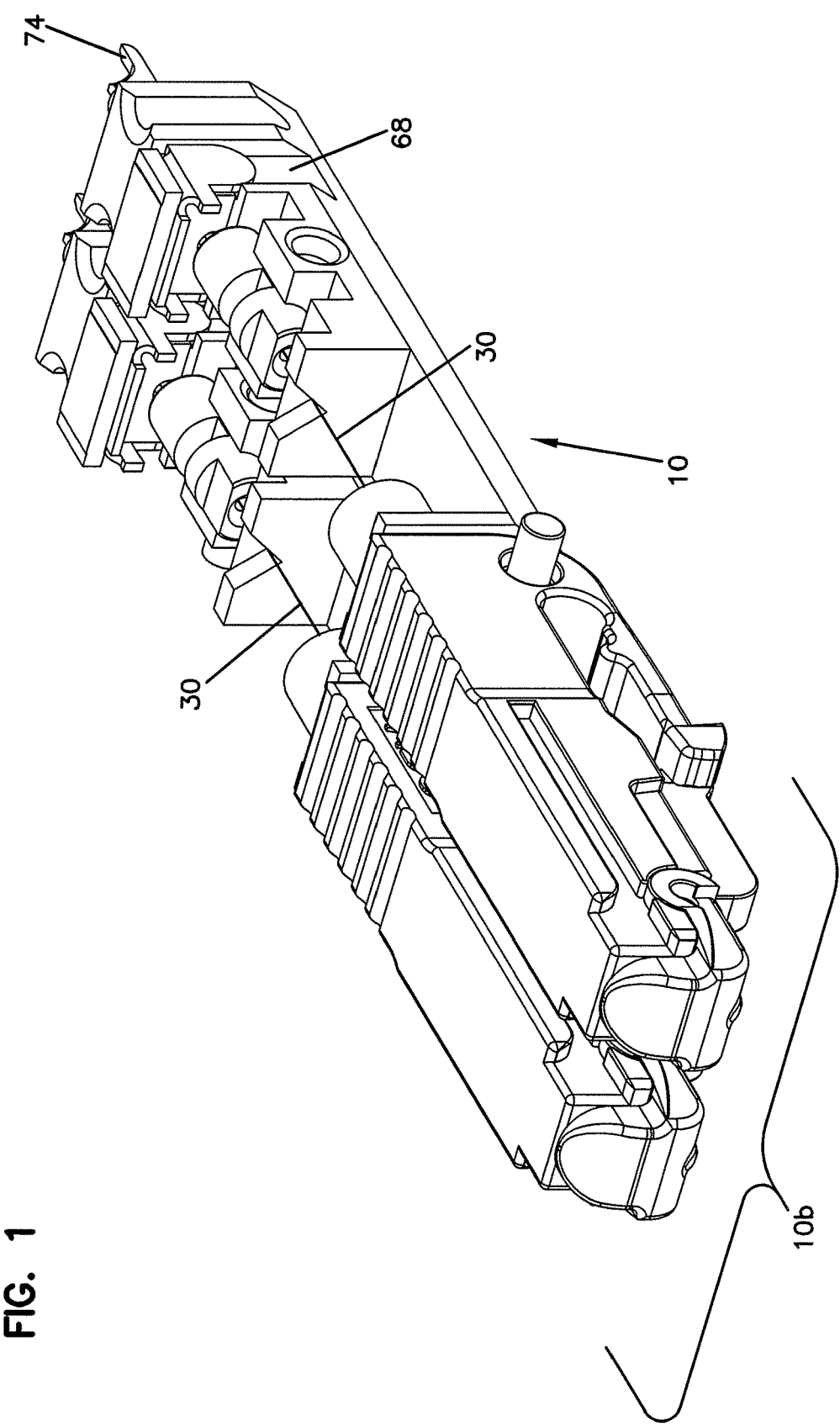
FIG. 1 is a perspective view of a fiber optic connector assembly having features that are examples of inventive aspects in accordance with the principles of the present disclosure, the fiber optic connector assembly shown in a fully assembled configuration.
Figure 1A:
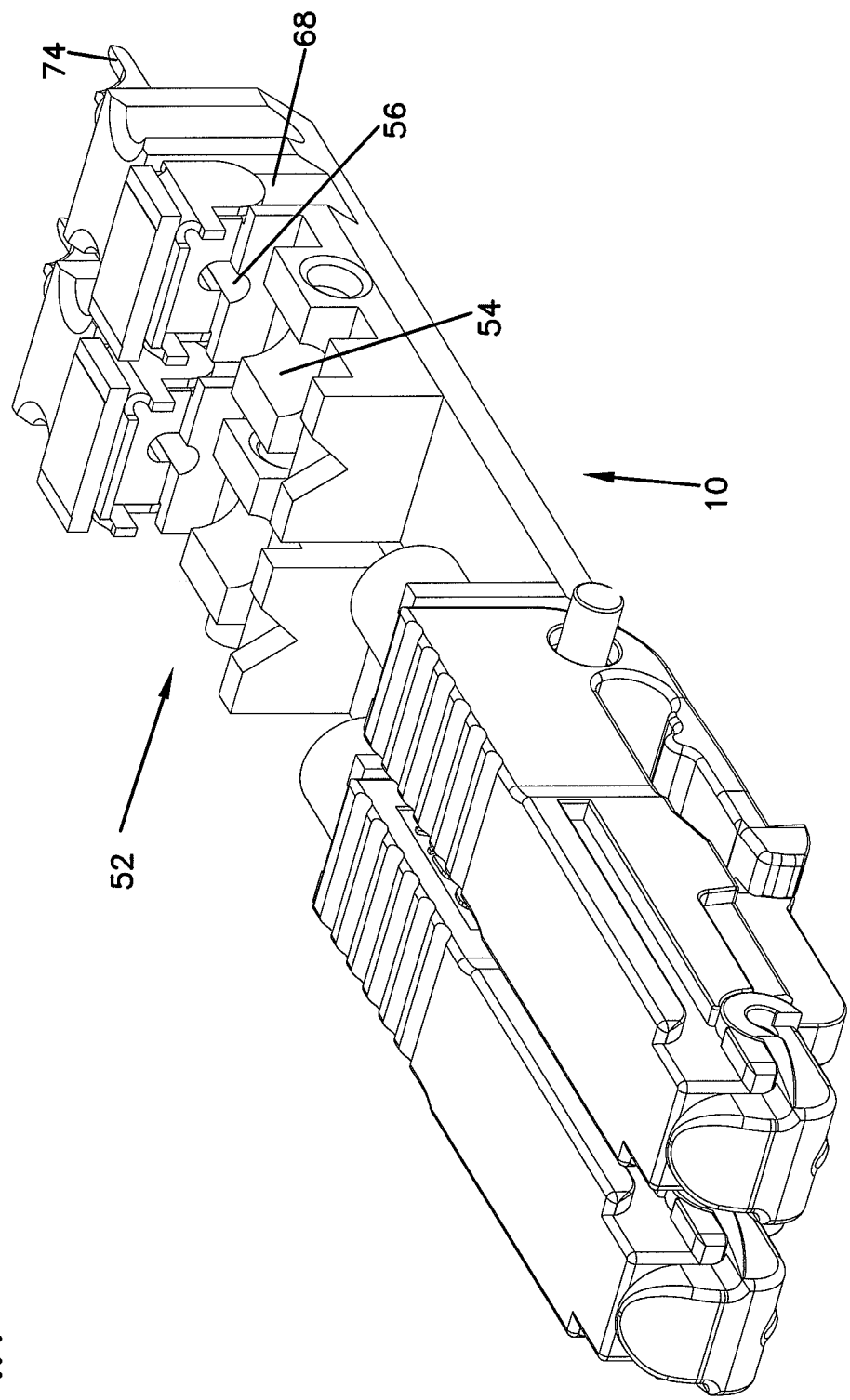
FIG. 1A illustrates the fiber optic connector assembly of FIG. 1 with the alignment guide of the assembly removed.
Figure 2A:
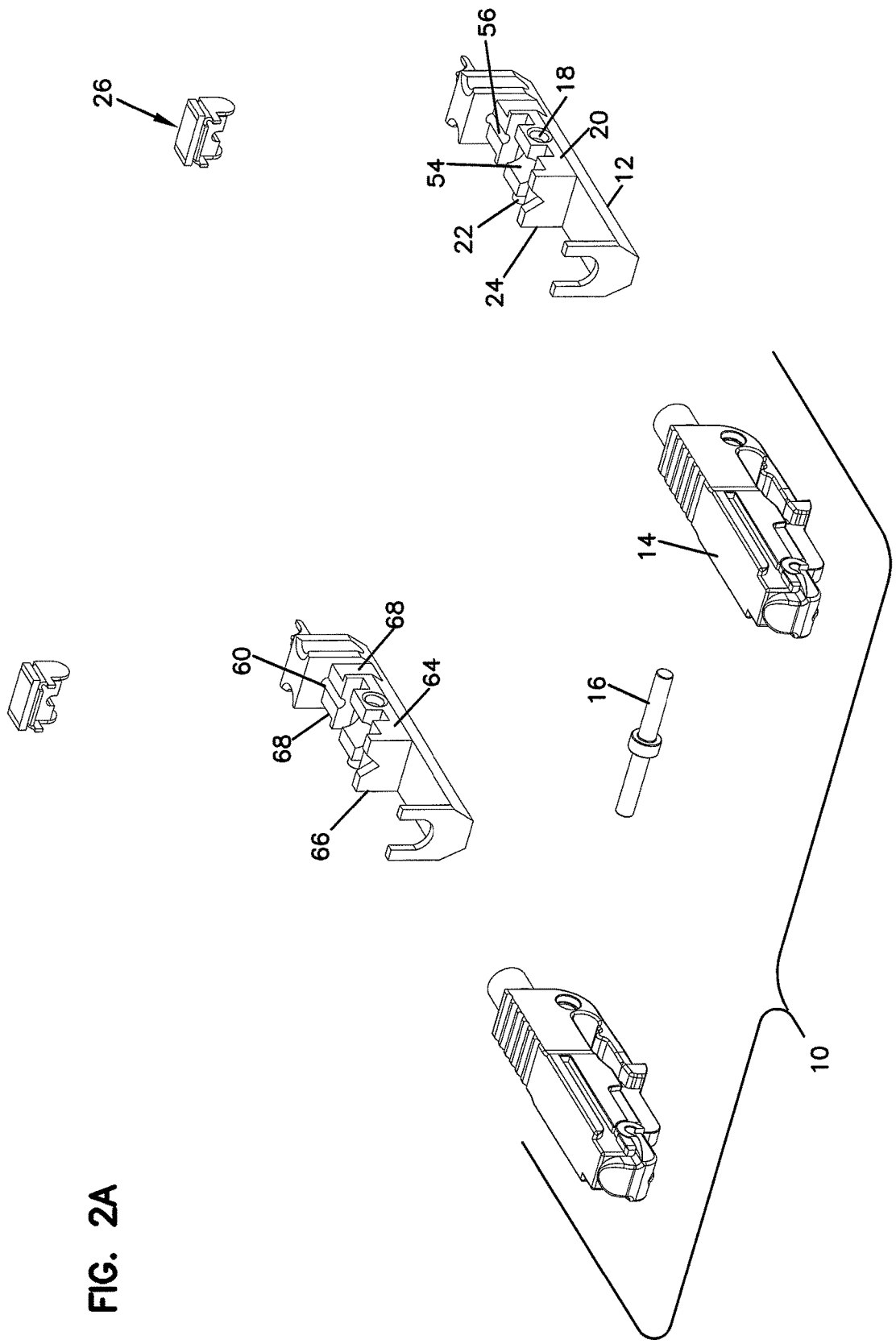
FIG. 2A illustrates the exploded view of the fiber optic connector assembly of FIG. 1A.
Figure 3:
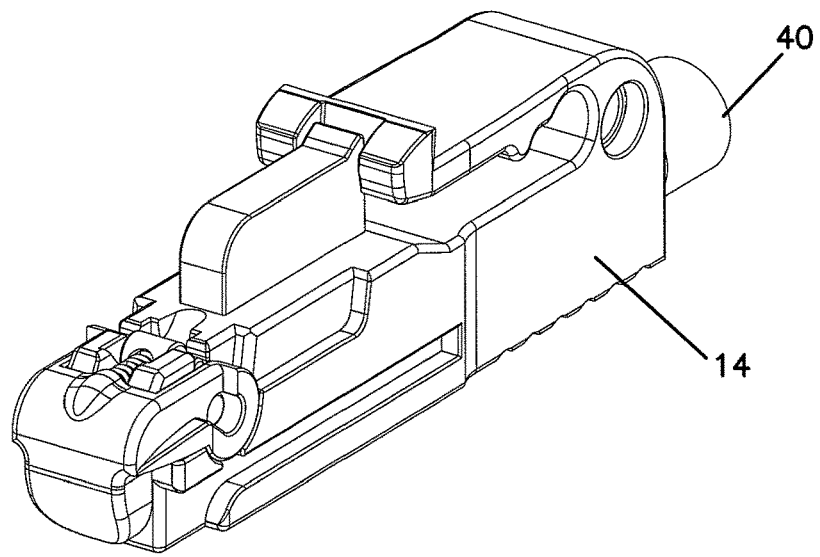
FIG. 3 is a front perspective view of a fiber optic connector of the fiber connector assembly of FIG. 1.

Referring now to FIGS. 1 and 2, a fiber optic connector assembly 10 that can be used in terminating at least one optical fiber in the field is shown. In the embodiment shown, the fiber optic connector assembly 10 includes two simplex assemblies 10a joined together to form a duplex assembly 10b. Each simplex assembly 10a generally includes a carrier 12 and a fiber optic connector 14 that is coupled to the carrier 12. The simplex assemblies 10a may be joined together with at least one removable joint pin 16 that is coupled to the connectors 14 of the assemblies 10a. Also, the each of the carriers 12 of the fiber optic connector assemblies 10a includes a hole 18 on a first side 20 and an integrally molded pin 22 on an opposing second side 24 so that two carriers 12 may be joined together. Since each carrier 12 includes a hole 18 and a molded pin 22 on opposite, alternating sides, a carrier 12 can be joined to another carrier at either side thereof.

The separability of the fiber optic connector assemblies 10a provides the advantage of using one or two assemblies, as needed, or being able to swap the assemblies when the position of the two fiber optic connectors 14 have to be switched relative to one another. For example, the position of the two fiber optic connectors 14 may have to be switched when the fiber optic connector assembly 10 of the present disclosure is used as an insert within a housing, such as the housing of a hybrid fiber/copper connector or a quad connector as described in U.S. Pat. Nos. 8,083,416 and 8,678,666, the entire disclosures of which are incorporated herein by reference.

As discussed in the above-mentioned patents that have been incorporated herein by reference, if the gender of one of the hybrid connectors or quad connectors needs to be changed, the position of the two fiber optic connectors 14 within the housing may need to be switched. This can be accomplished by separating the two simplex fiber optic connector assemblies 10a of the present disclosure and swapping their positions.

Although described in U.S. Pat. Nos. 8,083,416 and 8,678,666 as being usable in hybrid or quad connector housings, the fiber optic connector assembly 10 of the present disclosure can be used as an insert in any type of housing to protect the fiber optic connector assembly from damage.

While the connectors 14 shown and described as being used with the fiber optic connector assembly 10 of the present disclosure are either LX.5 or BX5 connectors as manufactured by ADC Telecommunications, Inc., which have been described in detail in U.S. Pat. Nos. 5,883,995; 6,142,676; 8,083,416; and 8,678,666, hereby incorporated by reference in their entirety, it will be understood by those skilled in the art that the scope of the present disclosure is not limited to the use of a LX.5 or BX5-type connector within the assembly. Also, while the fiber optic connector assembly 10 of the present disclosure is depicted and described as being formed from two simplex connector assemblies 10a joined together to form a duplex assembly 10b, in other embodiments, the fiber optic connector assembly 10 can be configured to include any number of connectors 14 and able to terminate any number of optical fibers. Also, while the fiber optic connector assembly 10 of the present disclosure includes simplex assemblies 10a that are removably joined together, in other embodiments, the fiber optic connector assembly 10 may include any number of assemblies that are integrally formed.

For sake of simplicity, the fiber optic connector assembly 10 of the present disclosure will be described with respect to one of the simplex assemblies 10a, with the understanding that the description thereof will be applicable to the other of the simplex assemblies 10a.

Still referring to FIGS. 1 and 2, the fiber optic connector assembly 10, in addition to the carrier 12 and the fiber optic connector 14, also includes a saddle assembly 26 and an alignment guide 28 that are coupled to the carrier 12. As will be described in further detail below, the alignment guide 28 is used to align a factory terminated optical fiber 30 with a field optical fiber 32, and the saddle assembly 26 is used to mechanically splice the factory fiber 30 to the field fiber 32.

Figure 4:
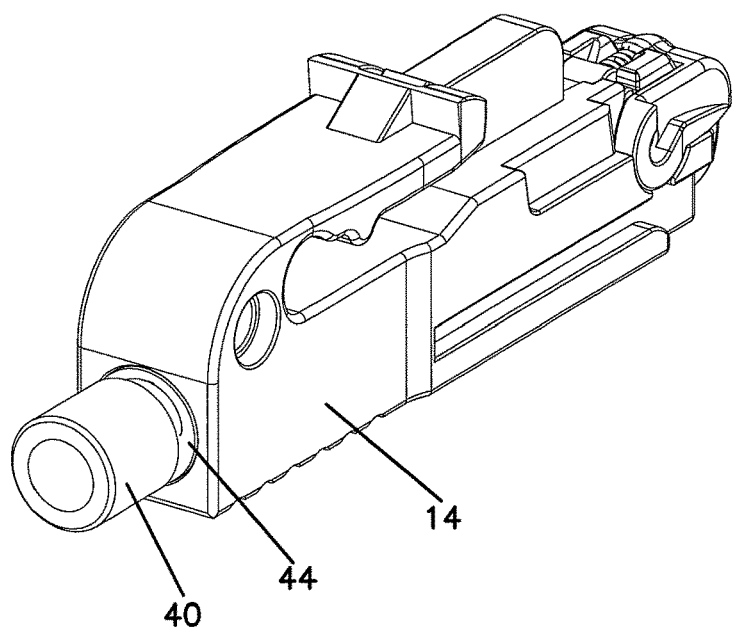
FIG. 4 is a rear perspective view of the fiber optic connector of FIG. 3.

The carrier 12 includes a connector end 34 and a cable end 36, which is oppositely disposed from the connector end 34. In the present embodiment, the connector end 34 defines a slot 38 for slidably mounting the connector 14. The connector 14, further details of which are described in U.S. Pat. Nos. 5,883,995; 6,142,676; and 7,534,050, incorporated herein by reference in their entirety, defines a tube 40 adjacent the rear end 42 of the connector 14. The tube 40 defines an annular groove 44 (see FIG. 4) disposed on the outer surface of the tube 40. The connector 14 is placed on the carrier 12 with the annular groove 44 slidably fitting in the slot 38 of the carrier 12. Once slidably inserted, the connector 14 may be epoxied to the carrier 12. It will be understood by those skilled in the art that the scope of the present disclosure is not limited to the carrier defining a slot for mounting the connector and that the connector can be mounted to the carrier in any other suitable manner.

Still referring to FIGS. 1 and 2, disposed between the connector end 34 and the cable end 36 of the carrier 12 is a fiber support 48. In the embodiment shown, the fiber support 48 defines a V-shaped guide way 50 that narrowed as the depth of the guide way 50 increases.

A termination region, generally designated by 52, is disposed between the cable end 36 of the carrier 12 and the fiber support 48. The termination region 52 is the portion of the carrier 12 wherein a factory terminated fiber 30 that extends from the connector 14 is mechanically spliced to a field fiber 32 that is aligned with the factory fiber 30.

The termination region 52 of the carrier 12 defines a groove 54 for supporting the alignment guide 28. The groove 54 is contoured to fit the outer surface of the alignment guide 28. The termination region 52 also defines a guide path 56 that extends from the rear end of the alignment guide 28 (when the alignment guide is in place) to the connector end 34 of the carrier 12. The guide path 56 is configured to generally align with a crimp tube hole 60 defined at the cable end 36 of the carrier 12 and also align with the guide way 50 of the fiber support 48 of the carrier 12. As will be described in further detail below, when the alignment guide 28 is positioned within the carrier 12, the guide path 56 also aligns with the throughhole 104 of the alignment guide 28 so that a factory terminated fiber 30 can be matched up to the field fiber 32.

Adjacent the cable end 36 of the carrier 12, each of the right and left sidewalls 64, 66 of the carrier 12 defines a vertical recess 68. The vertical recesses 68 are configured to accommodate the legs 70 of the saddle 72 when the saddle 72 is placed on the carrier 12, as will be discussed in further detail below. Although in the present disclosure, each carrier 12 is shown to include its own individual saddle 72, in other embodiments, a single, larger saddle may be used to expand the width of two or more simplex carriers 12.

The carrier 12 further includes a crimp tube 74, which is engaged with the cable end 36 of the carrier 12. In the present embodiment, the crimp tube 74 is in a press-fit engagement with the crimp tube hole 60 in the cable end 36 of the carrier 12. In other embodiments, the crimp tube 74 may be molded integrally with the carrier 12. The crimp tube 74 defines a passageway through which the cleaved field optical fiber 32 is inserted. Strength members/layers (e.g., Kevlar®) of a fiber optic cable can be crimped on the outer surface of the crimp tube 74 for securing the fiber optic cable to the carrier 12.

Figure 5:
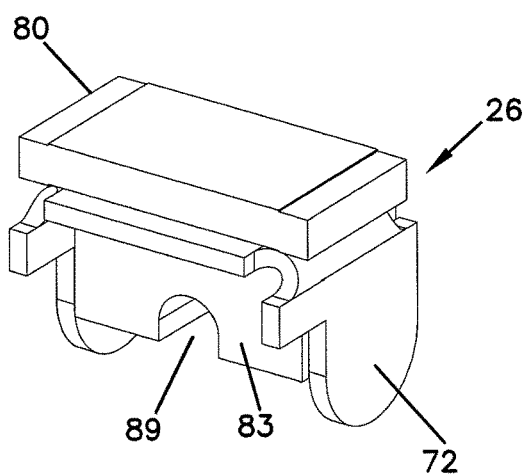
FIG. 5 is a perspective view of the saddle assembly of the fiber optic connector assembly of FIG. 1.
Figure 6:
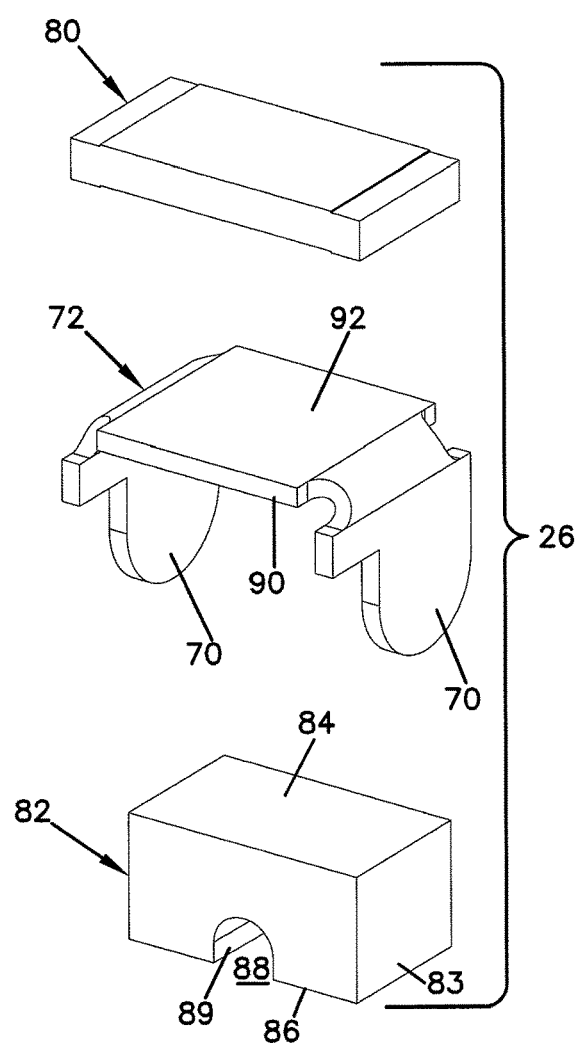
FIG. 6 is an exploded view of the saddle assembly of FIG. 5.
Figure 7:
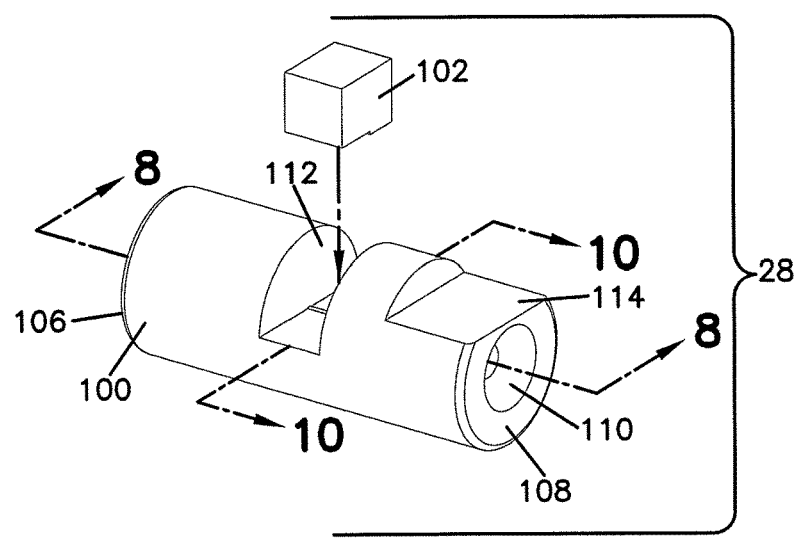
FIG. 7 is an exploded view of the alignment guide of the fiber optic connector assembly of FIG. 1.
Figure 8:
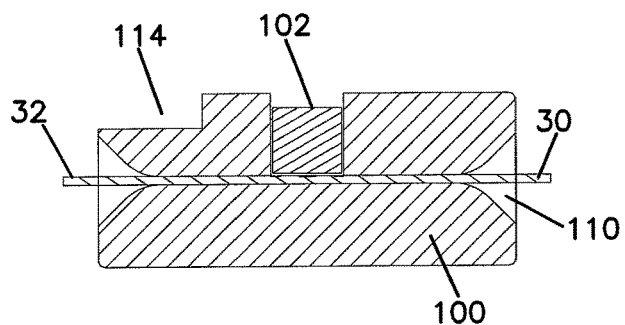
FIG. 8 is a cross-sectional view of the alignment guide taken along line 8-8 of FIG. 7 with the window of the alignment guide inserted into the base of the alignment guide.
Figure 9:
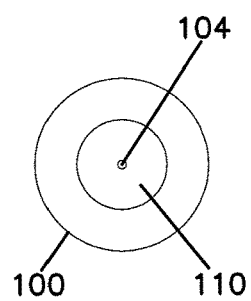
FIG. 9 is a front view of the alignment guide of FIG. 7.

Referring now to FIGS. 5 and 6, the saddle assembly 26 is shown in closer detail. The saddle assembly 26 includes the saddle 72 and a resistor 80 with a heat responsive adhesive element 82 configured to be positioned between the saddle 72 and the carrier 12. In the embodiment shown, the heat responsive element 82 is a glue pellet 83. Although in the depicted embodiment, glue pellet 83 is shown as being generally rectangular, it will be understood by those skilled in the art that other shapes for the glue pellet 83 may be used. The glue pellet 83 includes a first surface 84 and an oppositely disposed second surface 86. In the depicted embodiment, at least one pathway 88 is pre-formed in the glue pellet 83. In the depicted embodiment, the at least one pathway 88 is a channel 89 that is pre-formed in the second surface 86 of the glue pellet 83. The channel 89 is adapted to receive a portion of the cleaved field optical fiber 32 and a portion of the field buffer, which surrounds the cleaved field optical fiber 32. In the present embodiment, the channel 89 is arcuately shaped so as to conform to the outer surface of the buffer. It should be noted that the shape of the glue pellet 83 may be varied in other embodiments and may or may not include a preformed channel, depending upon the application.

As shown in FIG. 5, the glue pellet 83 is in thermally conductive contact with the saddle 72, which is in thermally conductive contact with the resistor 80. Thus, the saddle 72 is preferably made out of thermally conductive materials. In the present embodiment, the first surface 84 of the glue pellet 83 is in contact with a bottom surface 90 of the saddle 72, thereby establishing the thermally conductive contact between the glue pellet 83 and the saddle 72. The resistor 80 is in contact with a top surface 92 of the saddle 72, thereby establishing the thermally conductive contact between the resistor 80 and the saddle 72. Similar saddle assemblies including shaped adhesive pre-forms are described in U.S. Pat. Nos. 7,534,050 and 7,530,746, the disclosures of which are incorporated herein by reference in their entirety.

When the field optical fiber 32 is ready for termination, a portion of the outer surface of the buffer of the field fiber optic cable is disposed in the channel 89 of the glue pellet 83. In the present embodiment, the glue pellet 83 is shaped such that nearly half of the outer circumference of the outer surface of the buffer is disposed in the channel 89.

Still referring to FIGS. 5 and 6, the saddle 72 is generally U-shaped with two legs 70 extending vertically downward. The glue pellet 83 is received between the legs 70. The legs 70 are configured to slide within the recesses 68 defined on the sidewalls 64, 66 of the carrier 12. As will be described in further detail below, when the glue pellet 83 melts, the saddle 72 moves vertically downward with respect to the carrier 12 with the legs 70 riding along the recesses 68.

Referring now to FIGS. 7-19, the alignment guide 28 in the fiber optic connector assembly 10 serves as the location for the termination of the optical fibers. The alignment guide 28 includes a base 100 and an alignment window 102 that is separately mounted on the base 100.

The base 100 is generally cylindrical in shape. In other embodiments, other shapes may be used for the base 100.

The base 100 defines a throughhole 104 extending from a first end 106 to the second end 108. As shown in the Figures, at each end, the base defines a conical portion 110. The conical portions 110 taper from a larger diameter portion adjacent the ends toward a small diameter portion toward the center of the base 100. The conical portions 110 are configured to facilitate insertion of the optical fibers into the base 100.

The alignment guide 28 includes a cutout portion 112 about halfway along the length of the base 100. As will be discussed in further detail below, the cutout 112 accommodates the window 102 that is placed on the base 100. The cutout 112 is configured to expose and communicate with the throughhole 104 extending from the first end 106 to the second end 108 of the base 100.

The base 100 also includes a cutaway region 114 adjacent the second end 108. The cutaway region 114 is configured to accommodate a portion of the saddle 72 when the glue pellet 83 melts and the saddle 72 moves vertically downward. When the saddle 72 comes to rest, the bottom surface 90 of the saddle 72 may rest on the cutaway region 114 of the base 100.

When the base 100 is initially provided on the fiber optic connector assembly 10, a factory fiber 30 that is terminated to the connector 14 extends through the throughhole 104 in the base 100 about halfway through the length of the base 100. The conical portion 110 at the first end 106 of the base 100 facilitates initial insertion of the factory fiber 30 into the base 100 of the alignment guide 28. The end of the factory fiber 30 is exposed to the cutout portion 112 of the base 100.

The fiber that is factory terminated to the connector 14 and extending halfway through the length of the base 100 is supported by the fiber support 48 of the carrier 12 when the connector 14 and the base 100 are placed on the carrier 12.

Figure 17:
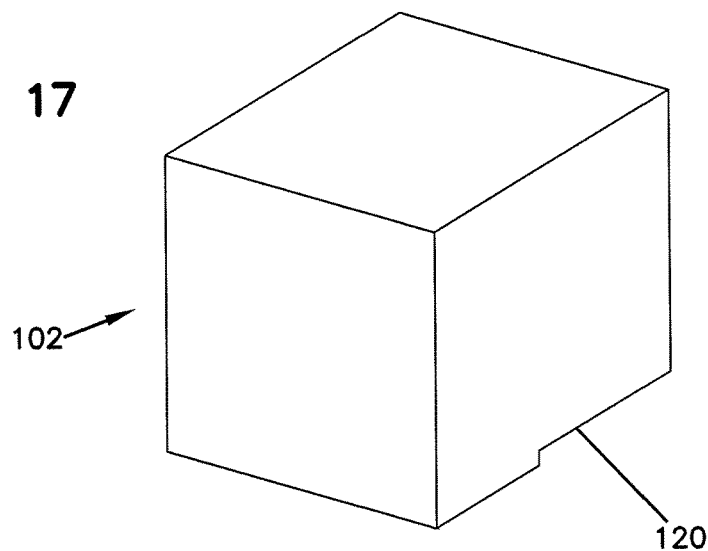
FIG. 17 is a perspective view of the alignment window of the alignment guide of FIG. 7.
Figure 18:
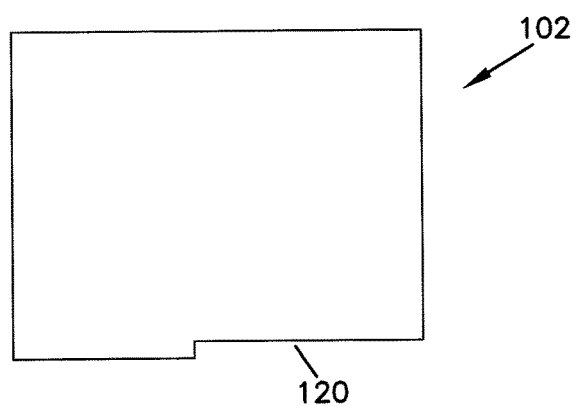
FIG. 18 is a front view of the alignment window of FIG. 17.
Figure 19:
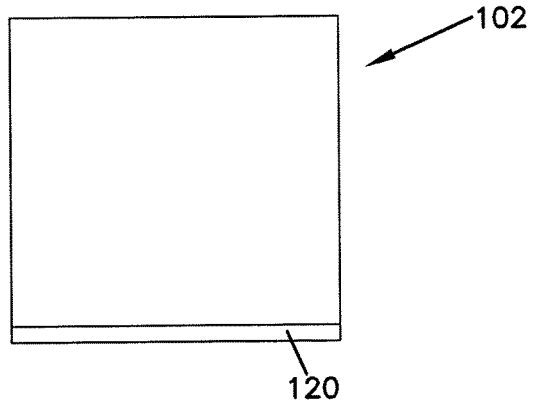
FIG. 19 is a right side view of the alignment window of FIG. 17.

Referring to FIGS. 17-19, the window 102 of the alignment guide 28 is shown in closer detail. The window 102 is placed within the cutout portion 112 of the base 100 and may be epoxied to the base 100. The window 102 is preferably made out of a transparent material such as pyrex. Other materials are possible. The window 102 is configured to allow visual confirmation of the alignment between the factory fiber 30 that extends about halfway into the base 100 (exposed to the cutout 112) and the field fiber 32 that will be inserted from the opposite end of the carrier 12 into the base 100.

Figure 10:
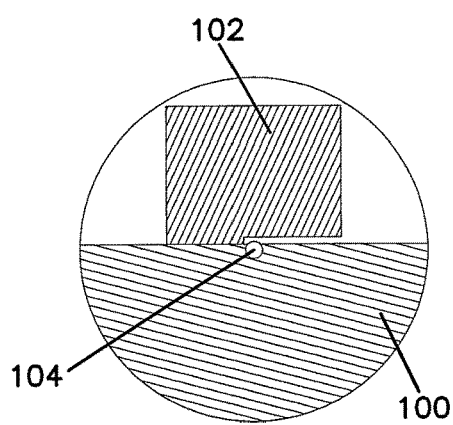
FIG. 10 is a cross-sectional view of the alignment guide taken along line 10-10 of FIG. 7 with the window of the alignment guide inserted into the base of the alignment guide.
Figure 11:
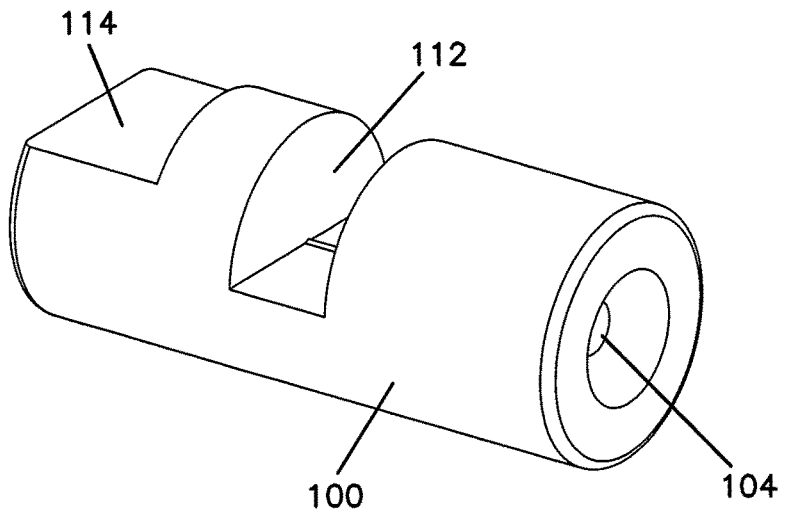
FIG. 11 is a perspective view of the base of the alignment guide of FIG. 7.
Figure 12:
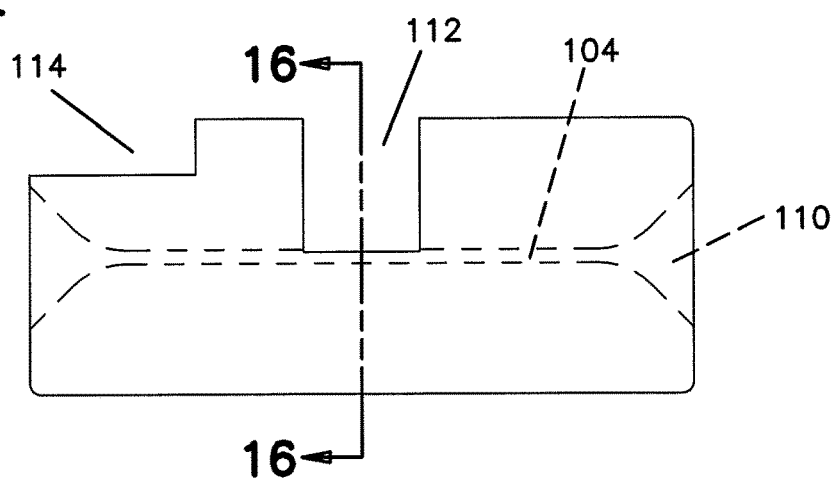
FIG. 12 is a side view of the base of FIG. 11.
Figure 13:
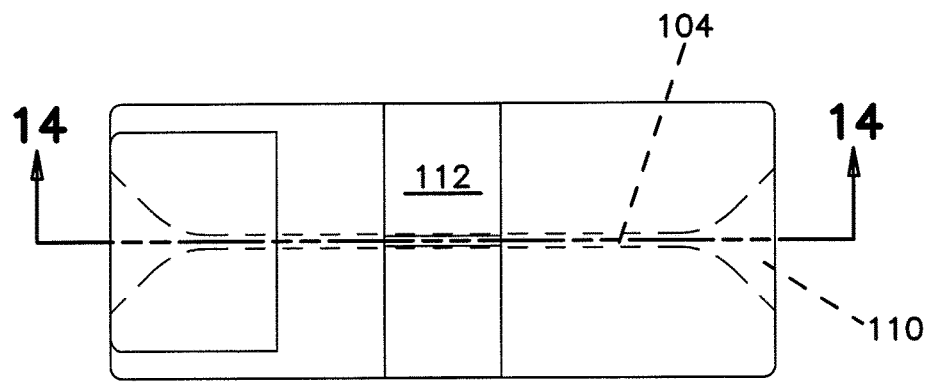
FIG. 13 is a top view of the base of FIG. 11.
Figure 14:
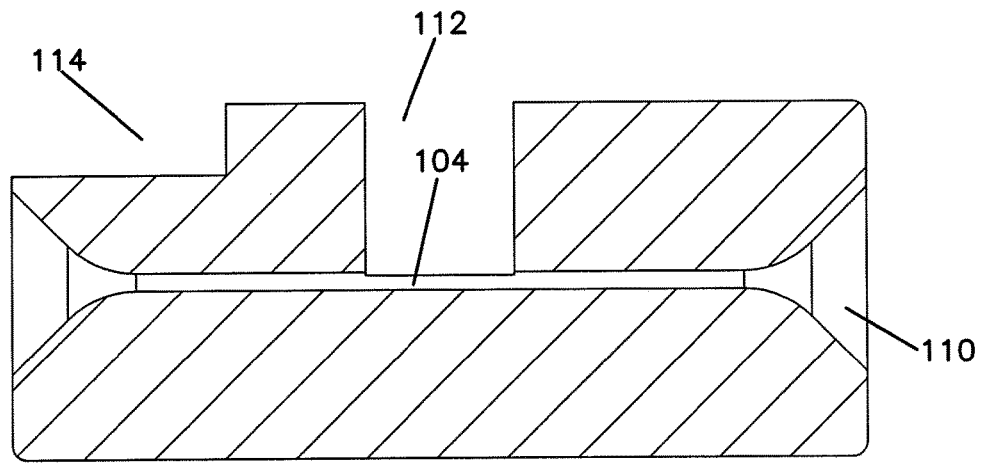
FIG. 14 is a cross-sectional view of the base taken along line 14-14 of FIG. 13.
Figure 15:
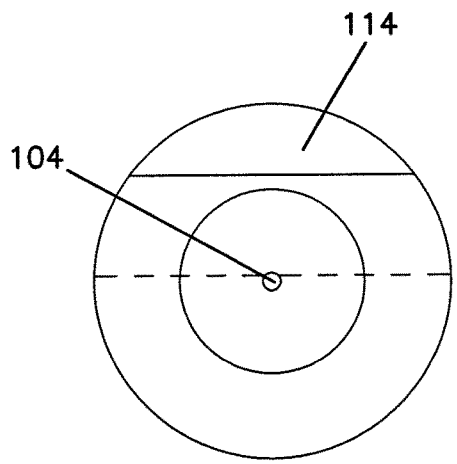
FIG. 15 is a rear view of the base of FIG. 11.
Figure 16:
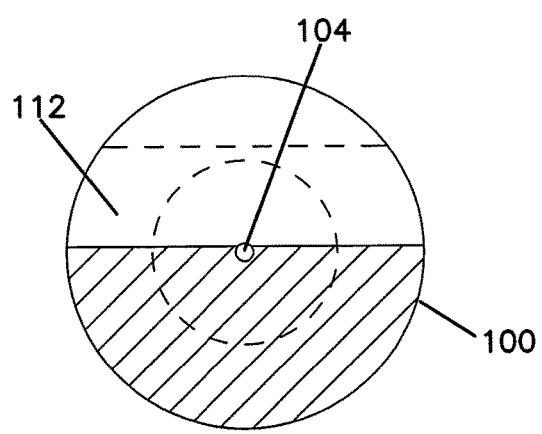
FIG. 16 is a cross-sectional view of the base taken along line 16-16 of FIG. 12.

The window 102 defines a box-like configuration with a cutout portion 120 at the bottom 122. As shown in FIG. 10, when the window 102 is placed within the cutout 112 of the base 100, the cutout portion 120 of the window 102 is exposed toward one side of the base 100 with a portion of the cutout 120 also lying over the factory fiber/field fiber alignment location. The cutout portion 120 of the window 102 is configured to allow any excess index matching gel to flow thereinto.

Once the factory fiber side of the fiber optic termination assembly is correctly positioned, the connector 14, the factory fiber stub 30 and the alignment guide 28 may be epoxied in place on the carrier 12.

In use, with the connector 14 engaged to the carrier 12, the optical fiber 30 affixed in the guide way 50 of the fiber support 48, and the factory fiber end inserted into the throughhole 104 of the base 100 of the alignment guide 28, an end of the cleaved field optical fiber 32 is inserted into the passageway of the crimp tube 74 defined at the rear of the carrier 12. The end of the cleaved field optical fiber 32 is inserted through the channel 89 of the glue pellet 83 and into the throughhole 104 of the base 100 of the alignment guide 28. In the present embodiment, an index matching gel is disposed between the cleaved end of the cleaved field optical fiber 32 and the end of the factory optical fiber 30. The index matching gel has an index of refraction that matches the index of refraction of the glass of the factory optical fiber 30 and the cleaved field optical fiber 32. According to one embodiment, the index matching gel may be hydroscopic. When the fiber ends are pushed together, the index matching gel flows into the cutout portion 120 of the window 102 filling at least a portion of the cutout 120.

With the cleaved end of the cleaved field optical fiber 32 inserted into the alignment guide 28, optical radiation is passed through the optical fibers to assess proper alignment of the fiber end of the factory fiber 30 and the cleaved end of the field fiber 32. As viewed from the window 102, if optical radiation is detectable at the junction, then the alignment/abutment is not correct. The cleaved end may have to be polished or cleaned and reinserted into the alignment guide 28. If little to no radiation is detectable at the junction of the factory fiber end and the cleaved field fiber end, then the cleaved field optical fiber 32 and the buffer can be secured to the fiber optic connector assembly 10 using the saddle assembly 26.

To secure the cleaved optical fiber 32 and the buffer to the fiber optic connector assembly 10, an electrical power source is connected to the resistor 80. Electrical current is passed through the resistor 80 which heats up the glue pellet 83 by way of the thermally conducting saddle 72. As the glue pellet 83 heats up, the glue pellet 83 becomes tacky and adheres to the buffer and the cleaved optical fiber 32 and closes the passageway of the crimp tube 74. When the current is interrupted, the glue pellet 83 resets to secure the buffer and the cleaved optical fiber 32 in its correct position in alignment with the factory optical fiber 30.

When the glue pellet 83 first starts to melt, the legs 70 of the saddle 72 slide vertically downward along the recesses 68 defined on the sidewalls 64, 66 of the carrier 12. As discussed previously, the cutaway region 114 of the base 100 is configured to accommodate at least a portion of the saddle 72 as the saddle 72 moves downwardly relative to the carrier 12. When the glue pellet 83 resets, the buffer of the field fiber 32 is sealed to the guide path 56 of the carrier termination region 52, the rear end of the base 100 of the alignment guide 28 is sealed to the groove 54 in the carrier 12, and the field fiber 32 is sealed to the base 100 of the alignment guide 28, securing the entire rear side of the fiber optic termination assembly 10 in correct alignment.

A field termination kit, as described in further detail in U.S. Pat. Nos. 7,676,134 and 7,929,819, the entire disclosures of which are incorporated herein by reference, can be used in terminating the field fiber to the factory fiber as discussed herein.

In one embodiment, the glue pellet 83 may be remeltable such that if the performed seal is not satisfactory, the glue pellet 83 can be remelted by the application of electric current and reset.

In one embodiment, the carrier 12 may be manufactured out of a dielectric or polymeric material such that substantially all of the heat energy from the resistor 80 is transferred to the conductive saddle 72 rather than the carrier itself. In other embodiments, the carrier 12 may be made out of metallic materials.

In other embodiments of the carrier 12 and the saddle 72 of the fiber optic connector assembly, the legs 70 of the saddle 72 may include inwardly extending tab portions at the ends of the legs 70 for securing the saddle 72 to the carrier 12 and to limit separation during upward movement of the saddle 72 relative to the carrier 12. In such an embodiment, the saddle 72 would snap fit onto the carrier 12 with the legs 70 extending along the recesses 68 and the inwardly extending tab portions extending into inwardly extending slots formed at the ends of the recesses 68. In this manner, the saddle 72 may remain attached to the carrier 12 even if the saddle 72 moves upward relative to the carrier 12, with the tabs of the legs 70 catching the inwardly extending slots at the bottom ends of the recesses 68 of the carrier 12.

As discussed above, with the field optical fiber 32 secured, the fiber optic connector assembly 10 can also be provided as an insert for a housing to protect the fiber optic connector assembly 10 from damage. A number of housings into which the fiber optic connector assembly 10 can be inserted are described in U.S. Pat. Nos. 8,083,416 and 8,678,666, previously incorporated by reference in their entirety.

Various modifications and alterations of this disclosure will become apparent to those skilled in the art without departing from the scope and spirit of this disclosure, and it should be understood that the inventive features are not to be unduly limited to the illustrative embodiments set forth herein.

The invention claimed is:

1. A fiber optic connector assembly comprising:
   a carrier defining a connector end and an oppositely disposed cable end, the connector end of the carrier configured for mounting a fiber optic connector;
   an alignment structure disposed on the carrier, the alignment structure including a first end and a second end and a throughhole extending from the first end to the second end, the alignment structure including a cutaway portion extending generally perpendicularly to and communicating with the throughhole, the cutaway portion configured such that a first optical fiber extending from a fiber optic connector mounted to the carrier can be positioned within at least a portion of the throughhole with an end of the first optical fiber to be located within the cutaway portion of the alignment structure; and
   a window disposed within the cutaway portion of the alignment structure so as to be positioned over the end of the first optical fiber, the window configured for visually inspecting an alignment of the end of the first optical fiber with an end of a second optical fiber to enter the cable end of the carrier.

2. A fiber optic connector assembly according to claim 1, wherein the alignment structure is generally cylindrical in shape.

3. A fiber optic connector assembly according to claim 1, wherein the window includes a cutaway portion configured to be located over the end of the first optical fiber extending from the fiber optic connector, the cutaway portion configured to accommodate for space for an index matching gel to flow when the end of the first optical fiber is brought in contact with the end of the second optical fiber.

4. A fiber optic connector assembly according to claim 1, wherein the fiber optic connector is an LX.5 connector.

5. A fiber optic connector assembly according to claim 1, wherein the window is made out of pyrex material.

6. A fiber optic connector assembly according to claim 1, further comprising a heat activated element that is configured to melt when exposed to a predetermined amount of heat and resolidify when the heat is removed for bonding the second optical fiber to the alignment structure.

7. A fiber optic connector assembly according to claim 6, further comprising a resistor positioned on the carrier for providing the heat energy for melting the heat activated element.

8. A fiber optic connector assembly according to claim 7, further comprising a conductive element positioned between the resistor and the heat activated element, the conductive element configured to transfer heat from the resistor to the heat activated element, the conductive element configured to move with respect to the carrier when the heat activated element melts.

9. A fiber optic connector assembly according to claim 6, wherein the heat activated element is a glue pellet.

10. A fiber optic connector assembly according to claim 1, wherein the alignment structure includes a conical portion on at least the first end and the second end of the alignment structure.

11. A fiber optic connector assembly according to claim 1, wherein the connector end of the carrier is configured to removably receive a fiber optic connector.

12. An alignment guide for aligning two optical fibers, the alignment guide comprising:
  a base including a first end and a second end and a throughhole extending from the first end to the second end, the base including a cutaway portion extending generally perpendicularly to and communicating with the throughhole; and
  a window disposed within the cutaway portion of the base, the window configured for visually inspecting an alignment of the optical fibers;
  wherein the base defines conical portions communicating with the throughhole on the first end and the second end to facilitate insertion of the optical fibers into the throughhole.

* * * * *